United States Patent [19]

Henn et al.

[11] Patent Number: 4,912,812
[45] Date of Patent: Apr. 3, 1990

[54] DEVICE FOR CONNECTING THE ENDS OF A TOOTHED BELT

[75] Inventors: Manfred Henn, Heidelberg; Herbert Bialek, Neckargemünd, both of Fed. Rep. of Germany

[73] Assignee: Heidelberger Druckmaschinen Aktiengesellschaft, Heidelberg, Fed. Rep. of Germany

[21] Appl. No.: 289,006

[22] Filed: Dec. 22, 1988

[30] Foreign Application Priority Data

Dec. 24, 1987 [DE] Fed. Rep. of Germany ....... 3744098

[51] Int. Cl.⁴ ................................................. F16G 3/00
[52] U.S. Cl. ................................. 24/31 R; 24/31 W; 474/204
[58] Field of Search .................. 24/31 R, 31 B, 31 W, 24/31 L, 31 F, 31 H; 474/204

[56] References Cited

U.S. PATENT DOCUMENTS

| 2,449,950 | 9/1948 | Nassimbene | 24/31 W |
| 3,327,359 | 6/1967 | Wiese | 24/31 W |
| 3,498,684 | 3/1970 | Hallaman | 474/204 |
| 3,638,281 | 2/1972 | Francois | 24/31 B |
| 3,664,490 | 5/1972 | Maruyama | 24/31 R |

FOREIGN PATENT DOCUMENTS

| 1872618 | 5/1963 | Fed. Rep. of Germany . |
| 2453463 | 5/1976 | Fed. Rep. of Germany . |
| 2322343 | 8/1982 | Fed. Rep. of Germany . |
| 1211432 | 3/1960 | France ............................. 24/31 W |
| 0000652 | 1/1983 | Japan ................................. 24/31 R |
| 0021042 | 2/1983 | Japan ................................. 24/31 R |
| 59-77146 | 5/1984 | Japan . |
| 1399943 | 7/1975 | United Kingdom .............. 24/31 W |

Primary Examiner—Victor N. Sakran
Attorney, Agent, or Firm—Nils H. Ljungman

[57] ABSTRACT

A device is for connecting the ends of a toothed belt having a plurality of longitudinal reinforcing cords. The device includes a connecting element having at least two interconnected lock parts. Each of the interconnected lock parts has a plurality of holes for respectively receiving an end of one of the reinforcing cords therein. Each of the ends of the reinforcing cords is connected with the lock parts by being force-locked within the hole.

14 Claims, 2 Drawing Sheets

DEVICE FOR CONNECTING THE ENDS OF A TOOTHED BELT

BACKGROUND OF THE INVENTION

1. Field of the Invention

This invention relates to a device for connecting the ends of a toothed belt which has longitudinal reinforcing cords and is of the type which can be employed in printing presses, sheet delivery systems or the like.

2. Description of the Prior Art

Many printing presses, sheet delivery systems or the like which are utilized in the printing field employ endless toothed belts for the transfer of power to various shafts, rollers, etc. The toothed belts insure that the various drive and driven elements will be rotated at predetermined relative speeds throughout the operation of the associated machinery. There remains a need for reliably connecting the ends of such toothed belts in order to be able to fabricate belts of a predetermined length and to be able to repair such belts that become weakened or damaged.

In one such connection for toothed belts, as described in German Laid Open Patent Appln. No. 23 22 343, the ends of the toothed belt are designed as tongues which mesh or engage with one another. The teeth of the tongues have bores or holes which are directly above the reinforcing cords and extend transversely of the toothed belt. In the area of this connection, the two ends of the toothed belt are connected by pins which are inserted through the bores or holes. The pins are held in place in the holes of the ends of the toothed belt, for example, by having a larger diameter than that of the holes. In the area of this connection, therefore, one tooth is formed from one or more tooth segments of the two ends of the toothed belt. This has a particularly disadvantageous effect since the toothed belt is subjected to tensile strain or compression stress which causes it to stretch. As a result, the shape of a tooth in the connection area tends to deviate from its original shape. Furthermore, the reinforcing cords, which act as a tension means, are also interrupted at the connection point or interface.

OBJECT OF THE INVENTION

It is an object of the invention to provide a device which reliably connects the ends of a toothed belt and includes the force-locking of the connection of the toothed belt.

It is another object to provide such a device which insures that reinforcing cords within the toothed belt are securely retained at the connection.

SUMMARY OF THE INVENTION

These and other objects of the invention are provided in a device which consists of at least two interconnected lock parts. The lock parts are provided with a plurality of holes, into which the exposed or bare ends of the reinforcing cords are respectively guided in order for them to be connected with the lock parts in a force-locking manner, such as by caulking.

These measures guarantee that the transmission of force runs directly from the reinforcing cords of the one end of the toothed belt, via the lock parts, to the reinforcing cords of the other end of the toothed belt. As a result, there is less strain and a reduced stress on the ends of the toothed belt in the tooth areas, and a maximum transmission of force in relation to the size or dimensions of the toothed belt is achieved. Further advantages of a toothed belt connection according to the invention lie in the fact that an endless toothed belt can be shortened as necessary or can be lengthened or extended as necessary by the use of another toothed belt and two connections. These features can be of particular importance, for example, in the case of a change in the transmission ratio or a re-dimensioning of a machine. Furthermore, it is possible to repair a toothed belt by removing the damaged portion of the toothed belt and inserting a new portion by means of two connections.

An advantageous development of the invention includes the fact that the ends of the toothed belt may also be respectively connected with the lock part by means of a pin extending transversely to the toothed belt, whereby the pin is arranged to be located in a tooth. As a result, stress or strain at the connection between the reinforcing cords and the lock parts is relieved and the ends of the reinforcing cords are prevented from bending.

The connection can also consist of the two lock parts being connected by one or more dowel or fitting screws for quickly mounting and dismounting the toothed belt.

The invention is provided in a preferred embodiment thereof including a device for connecting the ends of a toothed belt which has a plurality of longitudinal reinforcing cords. The device includes a connecting element having at least two interconnected lock parts. Each of the interconnected lock parts has a plurality of holes for respectively receiving an end of one of the reinforcing cords therein. Each of the ends of the reinforcing cords is connected with the lock parts by being force-locked within the hole.

DESCRIPTION OF THE PREFERRED EMBODIMENTS

Figure 1:
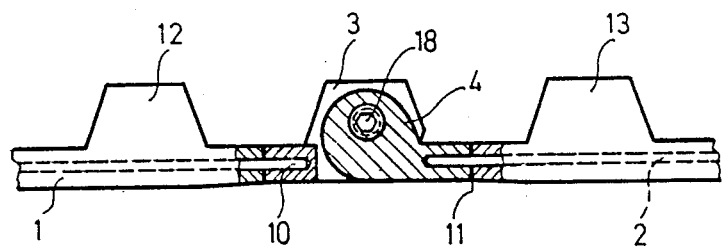
FIG. 1 is a lateral or side view of a device for connecting two ends of a toothed belt including various features of the invention.
Figure 2:
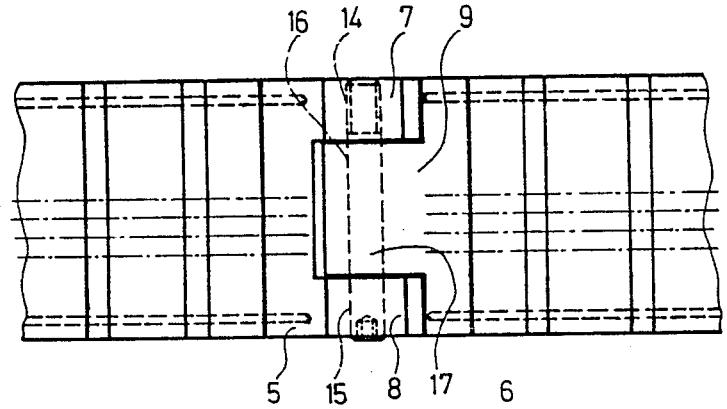
FIG. 2 is a plan or top view of the device shown in FIG. 1.

As seen in FIGS. 1 and 2, a preferred device, according to the invention, is used for connecting the ends of a toothed belt 1 having longitudinal reinforcing cords 2 by means of two lock parts 3, 4. The lock part 3 includes a web 5 and legs 7, 8, while the lock part 4 includes a web 6 and a leg 9. The webs 5, 6 include bores or holes 10, the number and direction of which correspond to the number and direction of the reinforcing cords 2. From the interfaces 11, which are respectively located after the last teeth 12, 13 at the ends of the toothed belt 1, the ends of the reinforcing cords 2 are laid bare or exposed. The bare ends of the reinforcing cords 2 are guided into the holes or bores 10 of the webs 5, 6, and connected in a force-locking manner with the respective lock part 3, 4. Although the connection is preferably made by caulking, a glued or welded connection would be possible. There are numerous industrial products well known in the adhesive art which could be employed to bond the ends of the reinforcing cords to the interior of the holes 10.

As best seen in FIG. 2, the web 5 and the legs 7, 8 are combined to form the lock part 3 and to provide it with a U-shape. The web 6 of the lock part 4 extends into the leg 9 so that they combine to form the lock part 4 having a T-shape. As best seen in FIG. 1, the preferred legs 7, 8 of the lock part 3 are designed as a tooth and the leg 9 as a circular arc or shape. The shape of the leg 9 is below the tooth portion of the lock part 3 to prevent any interference with the tooth portion as it passes over a gear wheel.

From FIGS. 1 and 2, it can be seen that in the legs 7, 8, 9 are provided with through holes 14, 15, 16, which lie approximately in the center or middle of the tooth shape and are parallel to the width or breadth of the toothed belt. The legs 7, 8, 9 of the lock parts 3, 4 mesh and engage with one another so that the through holes 14, 15, 16 have a common center line. A bolt, a pin or a dowel screw 17 is guided along the common center line to connect the lock parts 3, 4. When a dowel or fitting screw 17 is used as the connecting element, one of the holes 14, 15 can be provided a thread area so that the dowel screw 17 is self-locking and is dimensioned to project only slightly from the holes 14, 15. The dowel or fitting screw 17 is preferably provided with a hexagonal socket 18.

Figure 3:
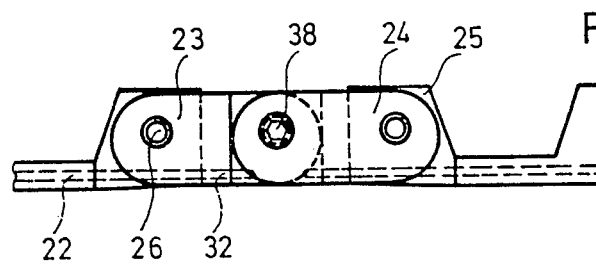
FIG. 3 is a lateral or side view of an alternative device for connecting two ends of a toothed belt including various features of the invention.
Figure 4:
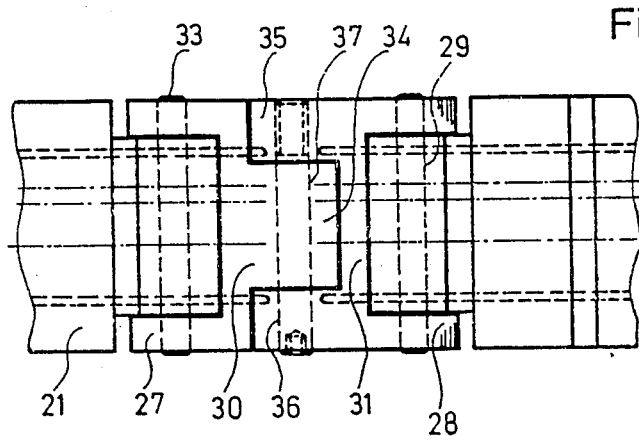
FIG. 4 is a plan or top view of the device shown in FIG. 3.

As seen in FIGS. 3 and 4, an alternative embodiment of the invention is for connecting the ends of a toothed belt 21 having longitudinal reinforcing cords 22 by means of two lock parts 23, 24. The ends of the toothed belt 21 are narrowed to include a one-step tapering with respect to their breadth. The last teeth 25 are pierced to include a hole 29, and the ends of the belt 21 are cut or beveled on the underside so that they are level or even with the lock parts 23, 24. Beyond the cut ends of the teeth 25, the ends of the reinforcing cords 22 are laid bare and exposed.

As best seen in FIG. 4, each of the preferred lock parts 23, 24 respectively includes a pair of side legs 27, 28, which contain holes 26 and lie in the side recesses provided at the ends of the toothed belt 21. Webs 30, 31 having holes 32 respectively adjoin the pair of side legs 27, 28. The number and direction of the holes 32 correspond to the number and direction of the ends of the reinforcing cords 22. The ends of the toothed belt 21 are connected in a force-locking manner, such as by caulking, to the lock parts 23, 24 as the ends of the reinforcing cords 22 are guided into the holes 32. The ends of the preferred toothed belt 21 are also connected at the pair of side legs 27, 28 of the webs 30, 31 by means of pins 33, which are force-fit in the holes 26, 29 in order to prevent the ends of the reinforcing cords 22 from bending.

A leg 34 extends from the web 30 of the lock part 23, and two legs 35 extend from the web 31 of the lock part 24 to surround the leg 34. The connection of the two lock parts 23, 24 is provided by means of a connecting element, such as a dowel screw 38, inserted in holes 37, 36 respectively in the legs 34, 35, as described for the embodiment shown in FIGS. 1 and 2. In this embodiment of the invention, the lock parts 23, 24 completely fill one tooth gap, so that the gear wheels on which the toothed belt 21 runs would each feature a respective, corresponding tooth gap located at the engagement points of the lock parts 23, 24 and extending over the length of two normal-size tooth gaps.

Figure 5:
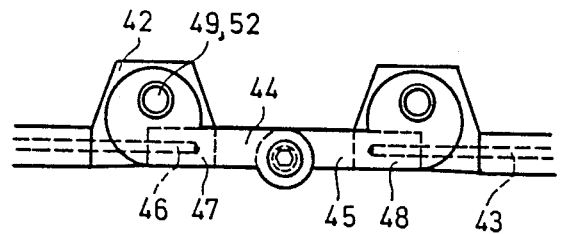
FIG. 5 is a lateral or side view of another alternative device for connecting two ends of a toothed belt including various features of the invention.
Figure 6:
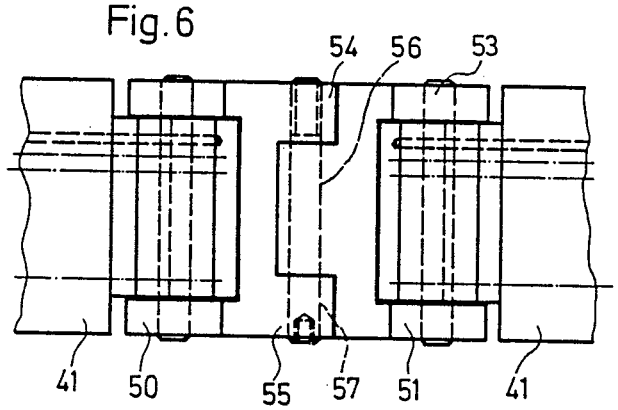
FIG. 6 shows a plan or top view of the device shown in FIG. 5.

As seen in FIGS. 5 and 6, another alternative embodiment of the invention includes each end of a toothed belt 41 with a tooth 42 in which the ends of the reinforcing cords 43 are laid bare and exposed from approximately the middle of the respective tooth 42 outwardly. The ends of the toothed belt 41 are connected with respective lock parts 44, 45 in a manner which is similar to the embodiment illustrated in FIGS. 3 and 4. A first connection includes the ends of the reinforcing cords 43 being connected to the holes 46 provided in webs 47, 48 of the lock parts 44, 45. A second connection includes holes 49 provided in the one-step tapered teeth 42 and holes 52 provided in a pair of circular-shaped or arc-shaped side legs 50, 51 of the lock parts 44 and 45 respectively. Each of the lock parts 44, 45 is respectively connected to its corresponding end of the toothed belt 41 by means of a pin 53 which is inserted in the hole 46 and aligned holes 52 thereof. The connection of the two lock parts 44, 45 by means of legs 54, 55, 56 and a dowel or fitting screw 57 is similar to the connections of the embodiments of the invention illustrated in FIGS. 1 through 4. However, the embodiment of FIGS. 5 and 6 differs from the embodiment of FIGS. 3 and 4 in that the legs 54, 55, 56 are located in the area of the tooth root to be below the level of the tooth gap. As a result, the gear wheels on which the toothed belt 41 runs do not require a special shape or form.

Figure 7:
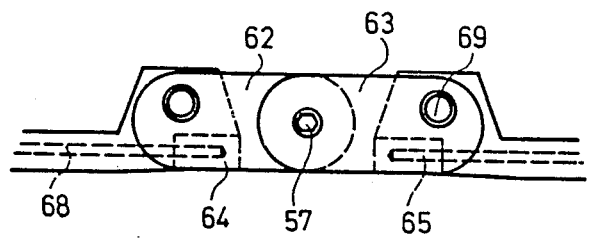
FIG. 7 is a lateral or side view of yet another alternative device for connecting two ends of a toothed belt including various features of the invention.

Still another alternative embodiment of the invention is illustrated in FIG. 7. The ends of the toothed belt 61 are similar to the ends of the toothed belt 41 illustrated in FIG. 5. The lock parts 62, 63 each consist of a web 64 having holes or bores 65 and two oval side legs. As with the embodiments in FIGS. 3 and 5, the ends of the toothed belt 61 include the reinforcing cords 68 being guided in the holes 65 and connected in a force-locking manner with the lock parts 62, 63. For a second connection of the toothed belt 61 with the lock parts 62, 63, there are provided holes 69 in the last teeth of the toothed belt 61 which are alignable with holes in the side legs of the lock parts 62, 63 so that pins, such as the pins 53, can be inserted therethrough.

Toothed belt drive or force transmission systems can be employed in printing presses, sheet delivery systems or the like, such as those disclosed in U.S. Pat. Nos. 3,902,711; 4,038,921; and 4,350,334. In this regard, various other devices for connecting the ends of toothed belts are disclosed in German Laid Open Patent Appln. No. 24 53 463; German Utility Model No. 18 72 618; and Japanese Pat. No. 59-77146(A). All of the above-mentioned documents are incorporated herein by reference as if the entire contents thereof were fully set forth herein.

The invention as described hereinabove in the context of the preferred embodiments is not to be taken as limited to all of the provided details thereof, since modifications and variations thereof may be made without departing from the spirit and scope of the invention.

What is claimed is:

1. A device for connecting the ends of a toothed belt, said toothed belt having a plurality of longitudinal reinforcing cords and a plurality of teeth, said device comprising:

a connecting element;

said connecting element including at least two interconnected lock parts;

each of said lock parts having a plurality of holes, each hole for receiving an end of one of said reinforcing cords therein;

each of said ends of said reinforcing cords being connected with one of said lock parts by being force-locked within said hole of its corresponding lock part; and each of said lock parts being positioned within an area defined by a single tooth of said plurality of teeth.

2. The device according to claim 1, wherein said each of said ends of said reinforcing cords are force-locked within said hole by caulking.

3. The device according to claim 1, wherein said two lock parts are connected in the area of at least one tooth of said toothed belt.

4. The device according to claim 1, wherein said lock parts respectively include legs which are in meshing engagement with one another and include through holes which have a common center line when said legs are in said meshing engagement and said lock parts are connected at said legs by dowel means installed in said through holes.

5. The device according to claim 1, wherein each of said ends of said toothed belt is also connected with said lock part by pin means located in a tooth of said toothed belt and lying across said toothed belt.

6. The device according to claim 1, wherein said two lock parts are interconnected by dowel means.

7. The device according to claim 1, wherein said two lock parts are located in the area of two teeth of said toothed belt.

8. The device according to claim 7, wherein each of said ends of said toothed belt is also connected with said lock part by pin means located in one of said two teeth and extending transversely of said toothed belt.

9. The device according to claim 8, wherein said two lock parts are interconnected by dowel means located between said two teeth.

10. The device according to claim 9, wherein said dowel means is located in an area of a tooth root to be below a tooth gap between said two teeth.

11. A device for connecting the ends of a toothed belt, said belt having a plurality of longitudinal reinforcing cords, said device comprising:

a connecting element;

said connecting element including at least two interconnected lock parts;

each of said lock parts including a web located in an area of a root of said toothed belt to be below the level of a tooth gap of said toothed belt;

each of said webs having a plurality of holes for respectively receiving an end of one of said reinforcing cords therein;

each of said ends of said reinforcing cords being connected with said lock parts by being force-locked within said hole;

at least a portion of said lock parts between said webs being connected by dowel means; and said at least a portion of said lock parts between said webs forming a tooth of said toothed belt.

12. The device according to claim 11, wherein said at least a portion of said lock parts including legs of said lock parts which are in meshing engagement with one another and include through holes which have a common center line when said legs are in said meshing engagement and said lock parts are connected at said legs by said dowel means installed in said through holes.

13. A device for connecting the ends of a toothed belt, said belt having a plurality of longitudinal reinforcing cords, said device comprising:

a connecting element;

said connecting element including at least two interconnected lock parts;

each of said lock parts including a web located in alignment with said reinforcing cords;

each of said webs having a plurality of holes for respectively receiving an end of one of said reinforcing cords therein;

each of said ends of said reinforcing cords being connected with said lock parts by being force-locked within said hole;

each of said webs having side legs extending to the sides of a last tooth of said end of said toothed belt;

pin means for connecting said side legs to said last tooth; and said lock parts being interconnected by dowel means in an area thereof between said last teeth.

14. The device according to claim 11, wherein said area of said lock parts interconnected by said dowel means is located in a tooth root to be below a tooth gap between said last teeth.

* * * * *